(12) United States Patent
Koskinen et al.

(10) Patent No.: US 10,764,771 B2
(45) Date of Patent: Sep. 1, 2020

(54) REDUCTION OF UNNECESSARY DOWNLINK CONTROL CHANNEL RECEPTION AND DECODING

(75) Inventors: Henri Markus Koskinen, Espoo (FI); Jussi Kustaa Ojala, Helsinki (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 861 days.

(21) Appl. No.: 13/128,616

(22) PCT Filed: Nov. 9, 2009

(86) PCT No.: PCT/IB2009/007386
§ 371 (c)(1),
(2), (4) Date: May 10, 2011

(87) PCT Pub. No.: WO2010/052566
PCT Pub. Date: May 14, 2010

(65) Prior Publication Data
US 2011/0222411 A1  Sep. 15, 2011

Related U.S. Application Data

(60) Provisional application No. 61/198,902, filed on Nov. 10, 2008.

(51) Int. Cl.
*H04L 12/911* (2013.01)
*H04W 24/10* (2009.01)
(Continued)

(52) U.S. Cl.
CPC .......... *H04W 24/10* (2013.01); *H04L 1/0026* (2013.01); *H04L 1/0027* (2013.01); *H04W 72/1289* (2013.01)

(58) Field of Classification Search
CPC .... H04L 1/0027; H04L 1/0026; H04W 24/10; H04W 52/365; H04W 52/367; H04W 74/0833
(Continued)

(56) References Cited

U.S. PATENT DOCUMENTS

| 8,112,092 B2 * | 2/2012 | Yamada | H04L 1/00 370/230 |
| 2003/0054850 A1 * | 3/2003 | Masseroni | H04W 52/367 455/522 |

(Continued)

FOREIGN PATENT DOCUMENTS

EP  1720264 A1  11/2006

OTHER PUBLICATIONS

3GPP TSG-RAN WG1 R1-083665 Further correction and clarification of CQI definition in TS.*
(Continued)

*Primary Examiner* — Asad M Nawaz
*Assistant Examiner* — Syed Ali
(74) *Attorney, Agent, or Firm* — Harrington & Smith

(57) ABSTRACT

A method for channel signaling is described. The method includes determining (e.g., by a UE) whether at least one DL subframe is a valid reference resource. If the at least one DL subframe is not a valid reference resource, reporting measurements of a DL channel measured during the at least one DL subframe is inhibited. The method may include determining (e.g., by an eNB) whether reporting of the at least one DL subframe of a DL channel is required. If reporting is not required, a message configured to cause the at least one UE to inhibit reporting measurements of the DL channel (e.g., CQI measurements) measured during the at least one DL subframe is sent to the UE. Determining whether the at least one downlink subframe is a valid reference resource is based at least in part on the message. Apparatus and computer readable media are also described.

17 Claims, 5 Drawing Sheets

(51) Int. Cl.
*H04L 1/00* (2006.01)
*H04W 72/12* (2009.01)

(58) Field of Classification Search
USPC .................................................. 370/240–245
See application file for complete search history.

(56) References Cited

U.S. PATENT DOCUMENTS

| | | | | |
|---|---|---|---|---|
| 2004/0219959 | A1* | 11/2004 | Khayrallah et al. | 455/575.7 |
| 2005/0201296 | A1 | 9/2005 | Vannithamby et al. | 370/241 |
| 2008/0261530 | A1 | 10/2008 | Gerstenberger et al. | |
| 2008/0273492 | A1* | 11/2008 | Jeong et al. | 370/329 |
| 2009/0247174 | A1* | 10/2009 | Zhang | H04L 1/1607 455/450 |
| 2009/0257385 | A1* | 10/2009 | Meylan | H04L 1/0045 370/329 |
| 2010/0035647 | A1* | 2/2010 | Gholmieh | H04W 52/244 455/522 |
| 2010/0061386 | A1* | 3/2010 | Olsson | H04W 76/11 370/401 |
| 2010/0111028 | A1* | 5/2010 | Kim | H04W 76/28 370/329 |
| 2011/0002290 | A1* | 1/2011 | Kim | H04L 1/0026 370/329 |
| 2011/0021230 | A1* | 1/2011 | Moberg et al. | 455/507 |
| 2011/0103335 | A1* | 5/2011 | Golitschek | H04L 1/0026 370/329 |
| 2012/0002603 | A1* | 1/2012 | Lohr | H04L 5/0055 370/328 |
| 2012/0026949 | A1* | 2/2012 | Kotecha | H04L 1/0026 370/329 |
| 2013/0023285 | A1* | 1/2013 | Markhovsky et al. | 455/456.1 |
| 2013/0028122 | A1* | 1/2013 | Ma et al. | 370/252 |

OTHER PUBLICATIONS

3GPP TSG-RAN WG1 R1-083665 (Year: 2008) attached as 36331-830.pdf.*
3GPP TS 36.331 (Year: 2008) attached as R1-083665_D1_.pdf.*
International Search Report and Written Opinion received for corresponding Patent Cooperation Treaty Application No. PCT/IB2009/007386, dated Mar. 25, 2010, 12 pages.
International Preliminary Report received for corresponding Patent Cooperation Treaty Application No. PCT/IB2009/007386, dated May 10, 2011, 8 pages.
3GPP TSG-RAN WG1 meeting 54is; R1-083665,; "Further Correction and Clarification of CQI definition in TS 36.213"; Sep. 29-Oct. 3, 2008 in Prague, Czech Republic; http://www.3gpp.org/TSG_RAN/WG1_RL1/TSGR1-54b/Docs/.
Office Action received for Korean Patent Application No. 2011-7013193, dated Sep. 24, 2012, 7 pages.
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.6.0, Sep. 2008, 137 pgs.
"3$^{rd}$ Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.3.0, Sep. 2008, 178 pgs.
"3$^{rd}$ Generation Partnership Project; Technical Specification Group Radio Access Network; Requirements for Further Advancements for E-UTRA (LTE-Advanced) (Release X)", 3GPP TR 36.913 V0.0.6, May 2008, 18 pgs.
"3rd Generation Partnership Project; Technical Specification Group Radio Access Network; Evolved Universal Terrestrial Radio Access (E-UTRA) Medium Access Control (MAC) protocol specification(Release 8)", 3GPP TS 36.321, v8.3.0, Sep. 2008, pp. 1-36.
"3rd Generation Partnership Project;Technical Specification Group Radio Access Network; Evolved Universal Terrestrial Radio Access (E-UTRA);Physical layer procedures (Release 8)", 3GPP TS 36.213, v8.4.0, Sep. 2008, pp. 1-60.
International Search Report and Written Opinion received for corresponding Patent Cooperation Treaty Application No. PCT/IB2009/007386, dated Mar. 25, 2010, 13 pages.
"Further Correction And Clarification of CQI Definition in TS 36.213", 3GPP TSG-RAN WG1 Meeting 54bis, R1-083665, Agenda: 6:3, Sep. 29-Oct. 3, 2008, 7 pages.
Office Action received for corresponding Korean Patent Application No. 2011-7013193, dated Sep. 24, 2012, 4 pages, No English Language Translation available.
3GPP TSG-RAN WG1 Meeting 54bis; *R1-083666, Further correction of CQI differential representation in TS 36.213*; Sep. 29-Oct. 3, 2008 in Prague, Czech Republic; Agenda item 6.3; Source: Panasonic (14 pages).
Huawei: "Control Signaling of MBMS Single-cell Transmission" 3GPP Draft; R1-081393 Control Signaling of MBMS Single-Cell Transmission, 3$^{rd}$ Generation Partnership Project (3GPP), Mobile Competence Centre; 650, Route Des Lucioles; F-06921 Sophia-Antipolis Cedex; France, vol. RAN WG1, No. Shenzhen, China; Mar. 31-Apr. 4, 2008.
"CQI/PM reference measurement periods", Philips et al., 3GPP TSG-RAN Meeting #54, R1-083438, Aug. 2008, 4 pgs.

\* cited by examiner

REDUCTION OF UNNECESSARY DOWNLINK CONTROL CHANNEL RECEPTION AND DECODING

RELATED APPLICATION

This application was originally filed as PCT Application No. PCT/IB2009/007386 filed Nov. 9, 2009 and claims priority to U.S. Provisional Application No. 61/198,902 filed on Nov. 10, 2008, which is incorporated herein by reference in its entirety.

TECHNICAL FIELD

The exemplary and non limiting embodiments in accordance with this invention relate generally to wireless communication systems, methods, devices and computer programs and, more specifically, relate to control channel signaling between a network access node and a mobile communication node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BSR buffer status report
BW bandwidth
CQI channel quality indicator
CRC cyclic redundancy code
DCI downlink control information
DL downlink (eNB towards UE)
DRX discontinuous reception
DTX discontinuous transmission
eNB E-UTRAN Node B (evolved Node B)
EPC evolved packet core
E-UTRAN evolved UTRAN (LTE)
FDD frequency division duplex
FDMA frequency division multiple access
LTE long term evolution
MAC medium access control
MBSFN multicast/broadcast single frequency network
MM/MME mobility management/mobility management entity
Node B base station
O&M operations and maintenance
OFDMA orthogonal frequency division multiple access
PDCCH physical downlink control channel
PDCP packet data convergence protocol
PDSCH physical downlink shared channel
PHY physical
PMI precoding matrix index
PUSCH physical uplink shared channel
RACH random access channel
RI rank information
RLC radio link control
RRC radio resource control
SC-FDMA single carrier, frequency division multiple access
SGW serving gateway
SR scheduling request
TA timing advance
TDD time division duplex
UE user equipment
UL uplink (UE towards eNB)
UTRAN universal terrestrial radio access network The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.6.0 (2008-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4.1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
functions for RRM: Radio Bearer Control, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
a measurement and measurement reporting configuration for mobility and scheduling.

It has been agreed in 3GPP that in LTE the UE receives downlink assignments and uplink grants on the PDCCH. The UE attempts to blindly decode the received PDCCHs in every subframe by checking the CRC masked with an identifier (id) known to the UE. Typically the UE does not know in advance when it will receive downlink assignments addressed to it. However, the situation is different regarding uplink data transmission. Although an uplink grant for data transmission is made by the eNB, making an UL grant to the UE is subject to the UE first having indicated that it has data pending in a buffer that is waiting to be transmitted. For this reason it can be appreciated that the UE will know when and when not to expect to receive an UL grant specifically for data transmission, and thus in principle the UE may avoid looking for an UL grant when one is not required.

However, it has also been agreed in 3GPP RAN WG #1 that the eNodeB can in any subframe (excluding subframes when the UE is configured for DRX/DTX) force the UE to send an aperiodic CQI report. The aperiodic CQI request is triggered with one specific bit in the UL grant. Furthermore, it is possible to request the aperiodic CQI report transmission without any simultaneous UL data transmission, e.g., the UE would transmit only the aperiodic CQI report (while possibly having no UL data buffered for transmission).

As presently specified each UE is configured via RRC signaling to one aperiodic CQI reporting mode (before explicit configuration a default mode is assumed depending on the transmission mode) and, as a result, the UE is required to monitor the PDCCH for UL grants even when no other UL transmission is needed by the UE.

In order to be able to report the CQI/PMI/RI, the UE needs to first perform the measurement to determine the instantaneous channel quality. In LTE Rel-8, it has been agreed that if the CQI/PMI/RI report shall be transmitted in the UL subframe n, the DL subframe where the CQI/PMI/RI measurements are performed (also known as the CQI measurement reference period or CQI reference resource) is the DL subframe n-4. The principle is illustrated in the FIG. 5, which shows the timing of the CQI reporting in LTE Rel-8. The UE receives the aperiodic CQI trigger on the PDCCH in the DL subframe #0, and performs the measurement based on the same subframe, e.g., the reference period for the CQI measurement is that same DL subframe #0. The aperiodic CQI report is sent on the PUSCH in the UL subframe #4.

Further, the eNodeB may allocate an UL transmission to the UE even though the UE does not have any data to transmit, or there may be DL data arrival when the TA timer of the UE has expired.

In the previous case the UE will transmit an empty BSR and padding. Although this particular type of allocation may not be likely to occur (e.g., if it does it may be due to an occurrence of a network error such as a loss of synchronization between the eNodeB and the UE), it could potentially occur whenever the UE is in an active state. It is implicitly defined in 3GPP TS 36.321 that the UE should then send the BSR.

In the former case, the DL data arrival PDCCH may be sent to allocate a dedicated preamble for RACH for the UE. This may occur when the UE's TA timer has expired and DL data has arrived at the eNode B. In this case it may not be critical to wait for a few milliseconds to the send the DL data arrival PDCCH.

One may consider that the eNB could send the UE an UL grant just in case the UE happens to have data in its buffer that the eNodeB is not aware of, e.g., polling the UE for data. This approach, however, has several drawbacks. For example, if the UL grant is made too early the eNodeB will simply receive an empty BSR, and if the UL grant is made too late then the UE will have already begun a data request, e.g., using a SR or the RACH procedure. Moreover, if the UE does have data to transmit it may, in any case, wait for the UL grant.

The fact that, as presently specified in Rel-8 of LTE, the UE must constantly monitor for UL grants is a clear disadvantage in those cases where monitoring for DL assignments is not necessary. One such scenario is in MBSFN subframes, where it has been agreed that DL assignments cannot be sent. Hence, forcing the UE to activate the RF circuitry to search for UL grants during those periods when the RF circuitry is not required for data transmission or reception results in the UE making unnecessary blind decodings of the PDCCH. The overall effect is an unnecessary increase in UE power consumption. Depending on the MBSFN configuration the number of such subframes can be significant, for example, up to six out of every 10 subframes may be configured as MBSFN subframes.

It should be further noted that the UE may not be able to measure CQI in a MBSFN or blank subframe, or during a measurement gap, since the reference signals may then have a different structure or may not be present. In such a case any aperiodic CQI triggered during such a subframe would be ambiguous and meaningless (as the UE 210 should perform the measurement for the aperiodic CQI in the DL subframe where the aperiodic CQI trigger is sent).

SUMMARY

The below summary section is intended to be merely exemplary and non-limiting.

The foregoing and other problems are overcome, and other advantages are realized, by the use of the exemplary embodiments in accordance with this invention.

In a first aspect thereof an exemplary embodiment in accordance with this invention provides a method for control channel signaling. The method includes determining (e.g., by a processor) whether at least one DL subframe is a valid reference resource. The method also includes, in response to determining that the at least one DL subframe is not a valid reference resource, inhibiting reporting measurements of a DL channel measured during the at least one DL subframe (e.g., by a processor).

In another aspect thereof an exemplary embodiment in accordance with this invention provides an apparatus for control channel signaling. The apparatus includes at least one processor; and at least one memory including computer program code. The at least one memory and the computer program code are configured to, with the at least one processor, cause the apparatus to perform operations. The operations include to determine whether at least one DL subframe is a valid reference resource; and in response to determining that the at least one DL subframe is not a valid reference resource, to inhibit reporting measurements of a DL channel measured during the at least one DL subframe.

In a further aspect thereof an exemplary embodiment in accordance with this invention provides a computer readable medium for control channel signaling. The computer readable medium is tangibly encoded with a computer program executable by a processor to perform actions. The actions include determining whether at least one DL subframe is a valid reference resource; and in response to determining that the at least one DL subframe is not a valid reference resource, inhibiting reporting measurements of a DL channel measured during the at least one DL subframe.

In another aspect thereof an exemplary embodiment in accordance with this invention provides an apparatus for control channel signaling. The apparatus includes means for determining whether at least one DL subframe is a valid reference resource (e.g., a processor); and means for, in response to determining that the at least one DL subframe is not a valid reference resource, inhibiting reporting measurements of a DL channel measured during the at least one DL subframe (e.g., a processor).

In a further aspect thereof an exemplary embodiment in accordance with this invention provides a method for control channel signaling. The method includes determining (e.g., by a processor) whether reporting by at least one UE of at least one DL subframe of a DL channel is required. The method also includes, in response to determining that reporting is not required, sending (e.g., via a transmitter), to the at least one UE, a message configured to cause the at least one UE to inhibit reporting measurements of the DL channel measured during the at least one DL subframe.

In another aspect thereof an exemplary embodiment in accordance with this invention provides an apparatus for control channel signaling. The apparatus includes at least one processor; and at least one memory including computer program code. The at least one memory and the computer program code are configured to, with the at least one processor, cause the apparatus to perform operations. The operations include to determine whether reporting by at least one UE of at least one DL subframe of a DL channel is required and, in response to determining that reporting is not required, to send, to the at least one UE, a message configured to cause the at least one UE to inhibit reporting measurements of the DL channel measured during the at least one DL subframe.

In a further aspect thereof an exemplary embodiment in accordance with this invention provides a computer readable medium for control channel signaling. The computer readable medium is tangibly encoded with a computer program executable by a processor to perform actions. The actions include determining whether reporting by at least one UE of at least one DL subframe of a DL channel is required; and, in response to determining that reporting is not required, sending, to the at least one UE, a message configured to cause the at least one UE to inhibit reporting measurements of the DL channel measured during the at least one DL subframe.

In another aspect thereof an exemplary embodiment in accordance with this invention provides an apparatus for control channel signaling. The apparatus includes means for determining whether reporting by at least one UE of at least one DL subframe of a DL channel is required (e.g., a processor); and means for, in response to determining that reporting is not required, sending, to the at least one UE, a message configured to cause the at least one UE to inhibit reporting measurements of the DL channel measured during the at least one DL subframe (e.g., a processor).

BRIEF DESCRIPTION OF THE DRAWINGS

The foregoing and other aspects of exemplary embodiments in accordance with this invention are made more evident in the following Detailed Description, when read in conjunction with the attached Drawing Figures, wherein.

DETAILED DESCRIPTION

Various exemplary embodiments in accordance with this invention relate in part to 3GPP LTE standardization and concept creation and, in particular, to Layer 1 (3GPP TS 36.2XX) and Layer 2 (3GPP TS 36.3XX) specifications. As such, another specification of interest is 3GPP TS 36.331, V8.3.0 (2008-09), 3rd Generation Partnership Project; Technical Specification Group Radio Access Network; Evolved Universal Terrestrial Radio Access (E-UTRA) Radio Resource Control (RRC); Protocol specification (Release 8).

While various exemplary embodiments in accordance with this invention relate to LTE release 8 (Rel 8), they may also pertain to subsequent releases, such as further releases of 3GPP LTE targeted towards future IMT A systems, referred to herein for convenience simply as LTE Advanced (LTE A). Reference may be made to 3GPP TR 36.913, V0.0.6 (2008 05), 3rd Generation Partnership Project; Technical Specification Group Radio Access Network; Requirements for Further Advancements for E UTRA (LTE Advanced) (Release X).

More specifically, various exemplary embodiments in accordance with this invention are directed to optimization of the UE behavior with respect to minimizing the number of unnecessary PDCCH receptions and blind decodings of received PDCCHs.

As was noted above, as presently specified there is no possibility to "turn off" CQI aperiodic reporting, as the UE is always assigned a CQI reporting mode, and, as a result, the UE is required to monitor the PDCCH for UL grants even when no other UL transmission is needed by the UE.

Figure 2:
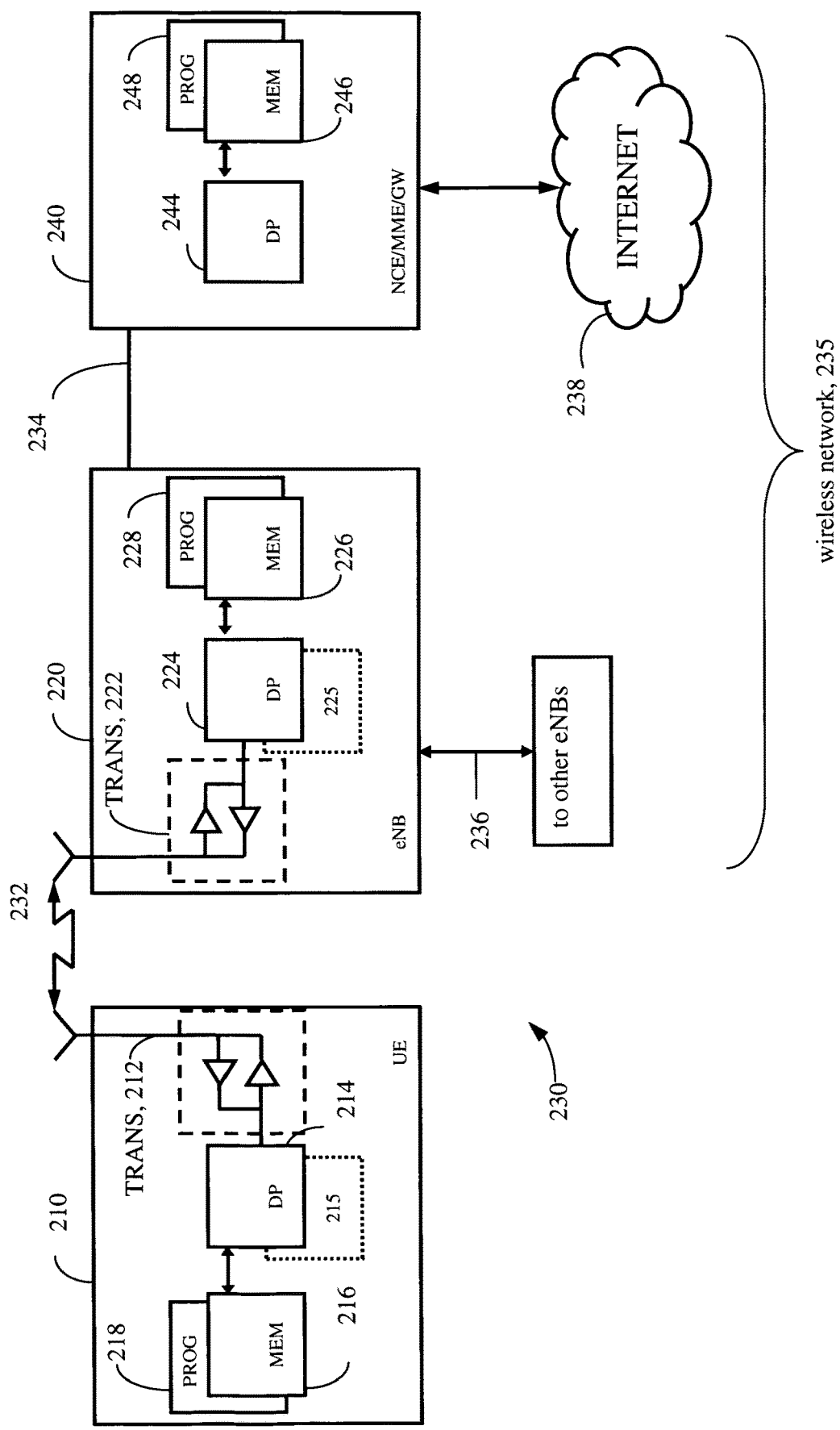
FIG. 2 shows a simplified block diagram of exemplary electronic devices that are suitable for use in practicing various exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

Figure 1:
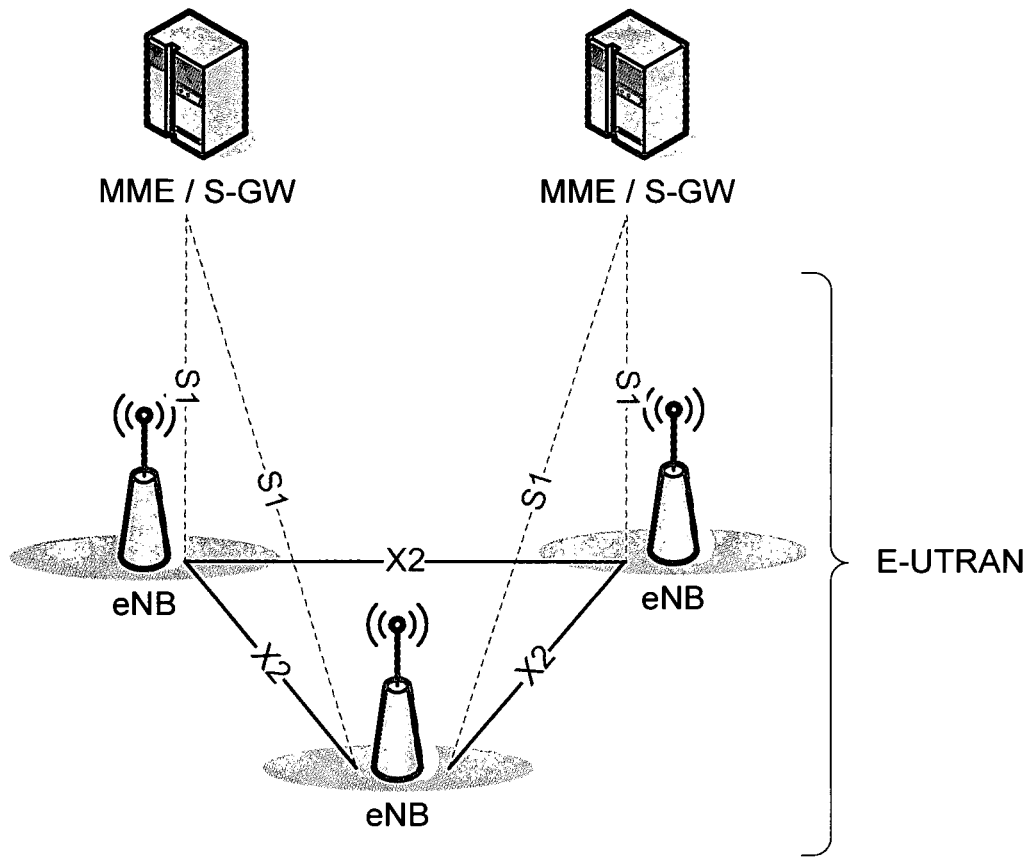
FIG. 1 reproduces FIG. 4.1 of 3GPP TS 36.300, and shows the overall architecture of the E UTRAN system.

In the wireless system 230 of FIG. 2, a wireless network 235 is adapted for communication over a wireless link 232 with an apparatus, such as a mobile communication device which may be referred to as a UE 210, via a network access node, such as a Node B (base station), and more specifically an eNB 220. The network 235 may include a network control element (NCE) 240 that may include the MME/S GW functionality shown in FIG. 1, and which provides connectivity with a network, such as a telephone network and/or a data communications network (e.g., the interne 238).

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 214 of the UE 210; by the DP 224 of the eNB 220; and/or by the DP 244 of the NCE 240, or by hardware, or by a combination of software and hardware (and firmware).

For the purposes of describing various exemplary embodiments in accordance with this invention the UE 210 and the eNB 220 may also include dedicated processors, for example RRC module 215 and a corresponding RRC module 225. RRC module 215 and RRC module 225 may be constructed so as to operate in accordance with various exemplary embodiments in accordance with this invention.

In general, the various embodiments of the UE 210 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 3:
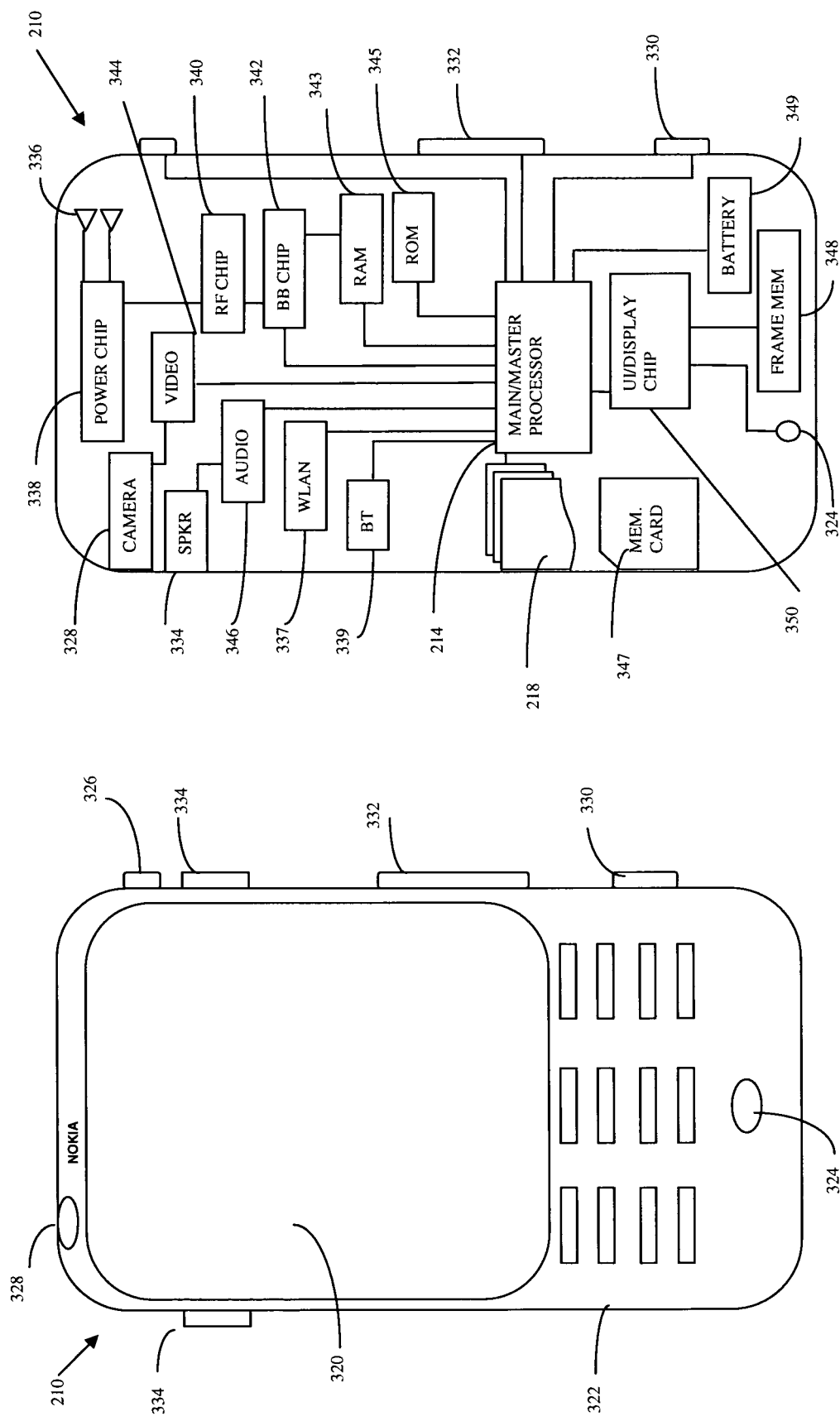
FIG. 3 shows a more particularized block diagram of an exemplary user equipment such as that shown at FIG. 2.

FIG. 3 illustrates further detail of an exemplary UE in both plan view (left) and sectional view (right), and the invention may be embodied in one or some combination of those more function-specific components. At FIG. 3 the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (e.g., for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 3 are seen multiple transmit/receive antennas 336 that are typically used for cellular communication. The antennas 336 may be multiband for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 are stored in one or more of these memories. All of these components within the UE 210 are normally powered by a portable power supply such as a battery 349.

Processors 338, 340, 342, 344, 346, 350, if embodied as separate entities in a UE 210 or eNB 220, may operate in a slave relationship to the main processor 214, 224, which may then be in a master relationship to them. Embodiments of this invention are most relevant to the RRC module 215 and RRC module 225, though it is noted that other embodiments need not be disposed there but may be disposed across various chips and memories as shown or disposed within another processor that combines some of the functions described above for FIG. 3. Any or all of these various processors of FIG. 3 access one or more of the various memories, which may be on-chip with the processor or separate therefrom. Similar function-specific components that are directed toward communications over a network broader than a piconet (e.g., components 336, 338, 340, 342-345 and 347) may also be disposed in exemplary embodiments of the access node 220, which may have an array of tower-mounted antennas rather than the two shown at FIG. 3.

Note that the various chips (e.g., 338, 340, 342, etc.) that were described above may be combined into a fewer number than described and, in a most compact case, may all be embodied physically within a single chip.

Turning now more particularly to exemplary embodiments in accordance with this invention, a first embodiment/solution to the problems discussed above (e.g., unnecessary PDCCH receptions and decodings by the UE 210) includes in the dedicated RRC signaling to the UE 210 an option of explicitly disabling aperiodic CQI reporting.

A second embodiment/solution, more targeted to the case of MBSFN subframes, specifies that in MBSFN subframes the UE 210 should assume that the PDCCH will never contain an uplink grant for purposes other than data transmission. By specifying this condition it implicitly makes it pointless for the eNB 220 to send such grants in MBSFN subframes. This means that the UE 210 can assume there are no unexpected UL grants that may be sent to the UE 210 (for empty BSR, DL data arrival PDCCH or aperiodic CQI) in special subframes such as the MBSFN subframes, or in "blank" subframes that may be used for relay support in LTE-A. Thus, the UE 210 would know when to monitor the PDCCH in those special frames.

Compared to the first solution, the second solution has the advantage that the eNB 220 may still trigger aperiodic CQI reporting in non-MBSFN subframes, where the UE 210 must in any case monitor the PDCCH for downlink allocations.

Further, and in addition to MBSFN subframes, similar "unused" subframes have also been proposed in 3GPP for the efficient support of relaying in LTE A (as was noted above). The foregoing embodiments in accordance with this invention would be applicable in these cases of unused subframes as well.

Both the first and second embodiments discussed above may be incorporated into the RRC specification of 3GPP TS 36.331. For example, the first embodiment may be implemented by adding a value "OFF" to the aperiodic CQI reporting modes.

Currently the aperiodic CQI mode is signaled to the UE 210 via RRC signaling using 2 bits, while only two or three modes exist depending on the transmission mode. Hence there is no need to increase the number of bits for the signaling of aperiodic CQI mode as not all bit values are currently specified for use.

Reference in this regard may be made to 3GPP 36.331, subclause 6.3.2 "Radio resource control information elements", which defines a CQI-Reporting information element (IE) as follows:

| CQI-Reporting information elements | |
|---|---|
| -- ASN1START | |
| CQI-Reporting ::= | SEQUENCE { |
| cqi-RepportingModeAperiodic | ENUMERATED { |
| | rm12, rm20, rm22, rm30, rm31, |
| | spare3, spare2, spare 1}, |
| nomPDSCH-RS-EPRE-Offset | INTEGER (0) OPTIONAL, |
| | -- value range FFS |
| cqi-ReportingPeriodic | CQI-ReportingPeriodic OPTIONAL |
| } | |
| CQI-ReportingPeriodic ::= | SEQUENCE { |
| pucch-Resource | SEQUENCE { },-- size, encoding FFS |
| reportingConfigInfo | SEQUENCE { |
| | periodicity ENUMERATED { |
| | ms2, ms5, ms10, ms20, ms32, ms40, ms64, |
| | ms80, ms128, ms160, ms256, msOff}, |
| | subFrameOffsetINTEGER (0..255), |
| | cqi-FormatIndicatorPeriodic BOOLEAN |
| } | OPTIONAL -- Need OC |
| } | |
| -- ASN1STOP | |

| CQI-Reporting field descriptions |
| --- |
| pucch-Resource |
| PUCCH resource (frequency and cyclic shift) to use for CQI reporting [RAN1 specification; FFS] |
| periodicity |
| Parameter: Periodicity ($N_P$), see TS 36.213 [23, 7.2.2]. Value ms2 corresponds to a periodicity of 2 ms, ms5 corresponds to a periodicity of 5 ms and msOff corresponds to no periodic CQI reporting. |
| subFrameOffset |
| Parameter: Subframe offset ($N_{OFFSET}$), see TS 36.213 [23, 7.2.2]. Offset depends on the configured periodicity. For 2 ms periodicity, available offset is 0 and 1 ms, for 5 ms available offset values are 0, 1 ms, 2 ms, 4 ms and 4 ms etc. |
| cqi-FormatIndicatorPeriodic |
| Parameter: PUCCH CQI Feedback Type, see TS 36.213 [23, table 7.2.2-1]. Depending on transmissionMode, reporting mode is implicitly given from the table. |
| cqi-ReportingModeAperiodic |
| Parameter: reporting mode. Value rm12 corresponds to Mode 1-2, rm20 corresponds to Mode 2-0, rm22 corresponds to Mode 2-2 etc. PUSCH reporting modes are described in TS 36.213 [23, 7.2.1]. |
| nomPDSCH-RS-EPRE-Offset |
| Parameter: Nominal PDSCH-to-RS-EPRE-offset [RAN1 specification; FFS]. |

Note in the foregoing field descriptions:

cqi-ReportingModeAperiodic

Parameter: reporting mode. Value rm12 corresponds to Mode 1-2, rm20 corresponds to Mode 2-0, rm22 corresponds to Mode 2-2 etc.

In accordance with these exemplary embodiments, the description of the cqi-ReportingModeAperiodic is changed to include a definition that enables the RRC module 225 of the eNB 220 to explicitly signal the RRC module 215 of the UE 210 that aperiodic CQI reporting is disabled (e.g., that aperiodic CQI reporting is turned off).

The second embodiment may be implemented by the insertion of descriptive text into the specification in the section describing the UE 210 actions upon reception of System Information Block type 2 (containing the possible MBSFN subframe allocation).

Reference in this regard may be made, as but one example, to 3GPP 36.331, subclause 5.2.2.9, which may be modified as shown below in bold type:

5.2.2.9 Actions upon reception of SystemInformationBlockType2

Upon receiving SystemInformationBlockType2, the UE shall:

1> if a (UE specific) paging cycle was received (signalling details FFS):

Editor's note: It is FFS is the UE specific DRX value is signalled by NAS or AS.

2> Apply the lowest of the paging cycle and the defaultPagingCycle included in the radioResourceConfigCommon;

1> else:

2> Apply the defaultPagingCycle included in the radioResourceConfigCommon;

1> if the IE mbsfn-SubframeConfiguration is included:

2> consider that no other DL assignments or UL assignments other than ones expected by the UE for the purpose of data transmission occur in the MBSFN subframes indicated in the IE mbsfn-SubframeConfiguration:

1> TBS

This possible modification to the standard text makes it explicit that in MBSFN subframes the UE 210 may assume that the PDCCH will never contain an unexpected uplink grant for purposes other than data transmission. By specifying this condition there is no need for the eNB 220 to send UL grants that the UE does not expect for uplink data transmission, in MBSFN subframes.

The following additional points may also be noted.

Concerning the aperiodic reporting, the CQI reports are triggered by the CQI bit in the UL grant and sent on the PUSCH. The reporting mode is configured via RRC. At present, there is always some mode configured, and the UE 210 then decodes each UL grant to determine if a CQI report is requested. Prior to this invention, there was no way of setting the aperiodic CQI reporting mode to "disabled".

According to an aspect of an exemplary embodiment in accordance with this invention, scheduled CQI for preparing data transmission after a MBSFN gap may be postponed to a non-MBSFN subframe, which has a minimal impact on performance.

Further, the second embodiment described above may explicitly be understood to say "for purposes other than data transmission". That is, if the UE 210 does have data to send, it still does monitor for UL allocations also in MBSFN subframes. Further, one may assume that the UE 210 would know when it has data available.

Further, it may be the case that DL data arrival preparation may be sent to the UE 210 up to four TTIs prior to the end of the MBSFN subframe. As such, the UE 210 receives a dedicated preamble via the PDCCH for DL data arrival. This occurs when the UE 210 TA timer (TAT) is expired and DL data arrives at eNB 220. In this case format 1A with modifications is sent to the UE 210. Note that this may be partially forbidden in an existing setup, since the UE 210 may not wait for the DL format in a MBSFN subframe (format 1A is the DL format). However, since this situation should not often arise, furthermore according to various exemplary embodiment in accordance with this invention, the DL data arrival format 1A may be postponed to a non-MBSFN subframe.

One important advantage that may be gained by the use of various exemplary embodiments in accordance with this invention is that the UE 210 is permitted to not monitor PDCCH UL grants when not required by data transmission. This can be especially useful in the context of MBSFN subframes, or the LTE Advance subframes dedicated for relay usage, where the monitoring of the PDCCH DL assignments is not required. The implementation and use of various embodiments of the invention thus clearly aids in optimizing UE 210 power consumption by allowing for switching off at least part of the RF circuitry, such as the receiver, when PDCCH reception is not required by the UE 210. As can be appreciated, at least a portion of the baseband circuitry may also be powered down or off, since unnecessary PDCCH blind decodings are not required either.

In addition to MBSFN subframes, various exemplary embodiments in accordance with this invention may be applied to measurements gaps and possibly to blank subframes as well.

Furthermore, it should be noted that various exemplary embodiments in accordance with this invention may be extended to also cover periodic CQI reporting. For example, if the DL subframe where the UE 210 should perform the CQI measurement (in other words the CQI measurement reference period) happens to be a MBSFN subframe, a blank subframe, or if the DL subframe falls into a measurement gap, the UE 210 may not send the periodic CQI report.

Based on the foregoing it should be apparent that various exemplary embodiments in accordance with this invention provide a method, apparatus and computer program(s) to aid in reducing UE 210 power consumption by not requiring the UE 210 to receive and decode unnecessary control channel transmissions.

Figure 4:
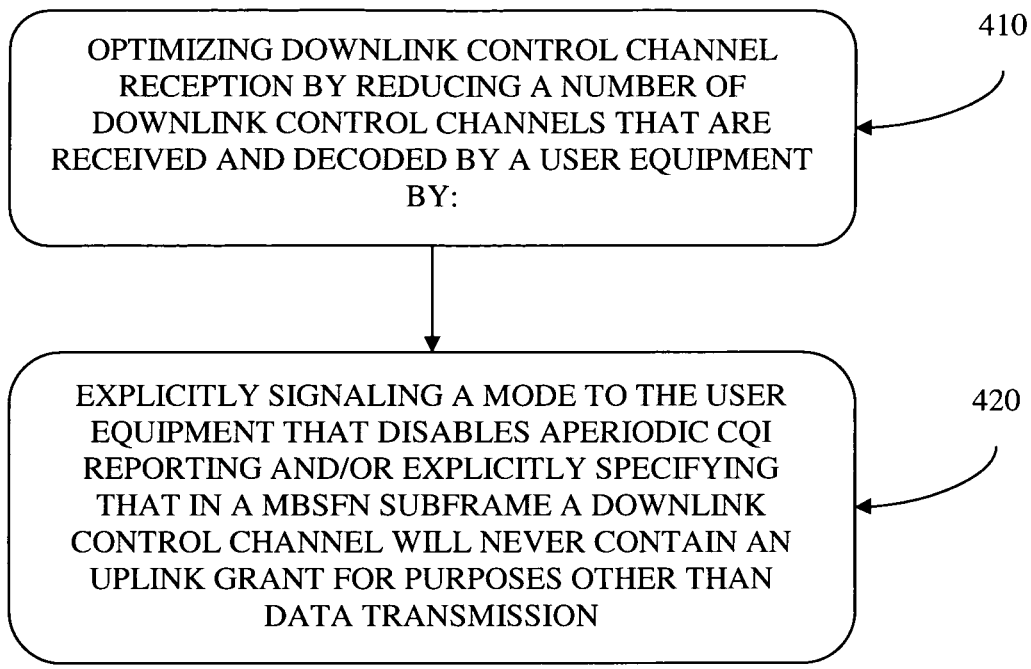
FIG. 4 is a logic flow diagram that illustrates the operation of an exemplary method, and a result of execution of computer program instructions embodied on a computer readable memory, in accordance with various exemplary embodiments of this invention.

FIG. 4 is a logic flow diagram that illustrates the operation of a method, and a result of execution of computer program instructions, in accordance with exemplary embodiments in accordance with this invention. In accordance with these exemplary embodiments a method performs, at Block 410, a step of optimizing downlink control channel reception by reducing a number of downlink control channels that are received and decoded by a user equipment by, at Block 420, explicitly signaling a mode to the user equipment that disables aperiodic CQI reporting and/or explicitly specifying that in a MBSFN subframe a downlink control channel will never contain an uplink grant for purposes other than data transmission.

In the method of FIG. 4, where if a downlink subframe where the UE should perform a CQI measurement happens to be a MBSFN subframe, a blank subframe, or if the DL subframe falls into a measurement gap, the UE may not send a periodic CQI report.

In the method of FIG. 4, where the user equipment takes steps to reduce power consumption.

Figure 6:
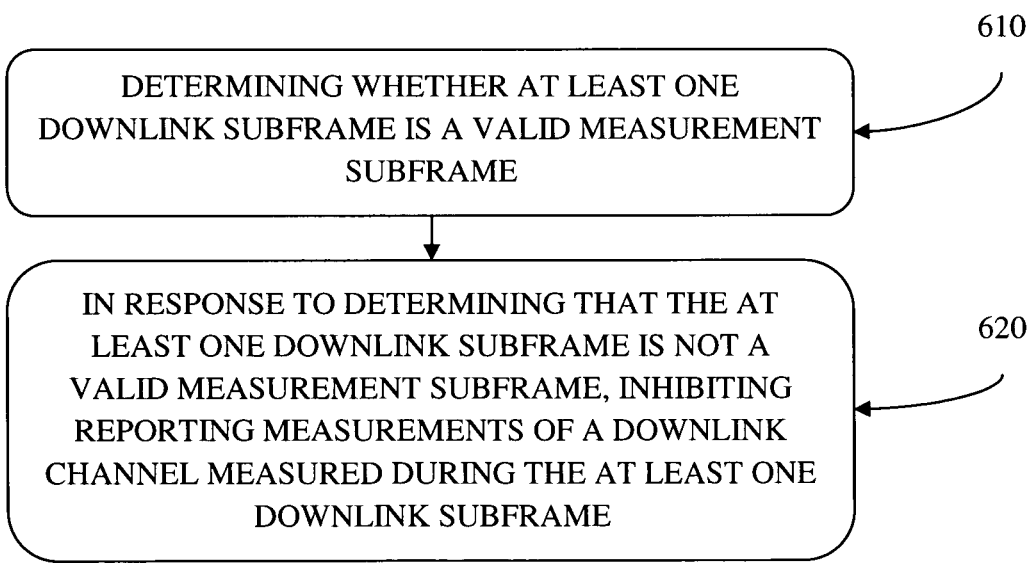
FIG. 6 is a logic flow diagram that illustrates the operation of another exemplary method, and a result of execution of computer program instructions embodied on a computer readable memory, in accordance with various exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 610, a step of determining whether at least one downlink subframe is a valid reference period is performed. A step of, in response to determining that the at least one downlink subframe is not a valid reference period, inhibiting reporting measurements of a downlink channel measured during the at least one downlink subframe is preformed at Block 620.

Figure 7:
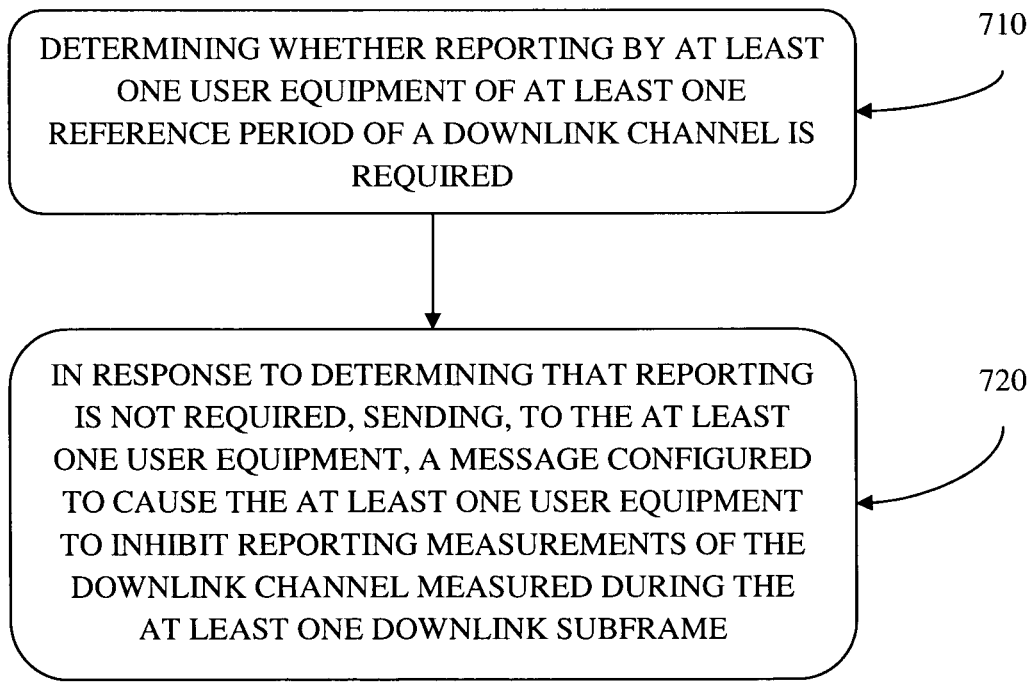
FIG. 7 is a logic flow diagram that illustrates the operation of a further exemplary method, and a result of execution of computer program instructions embodied on a computer readable memory, in accordance with various exemplary embodiments of this invention.
Figure 5:
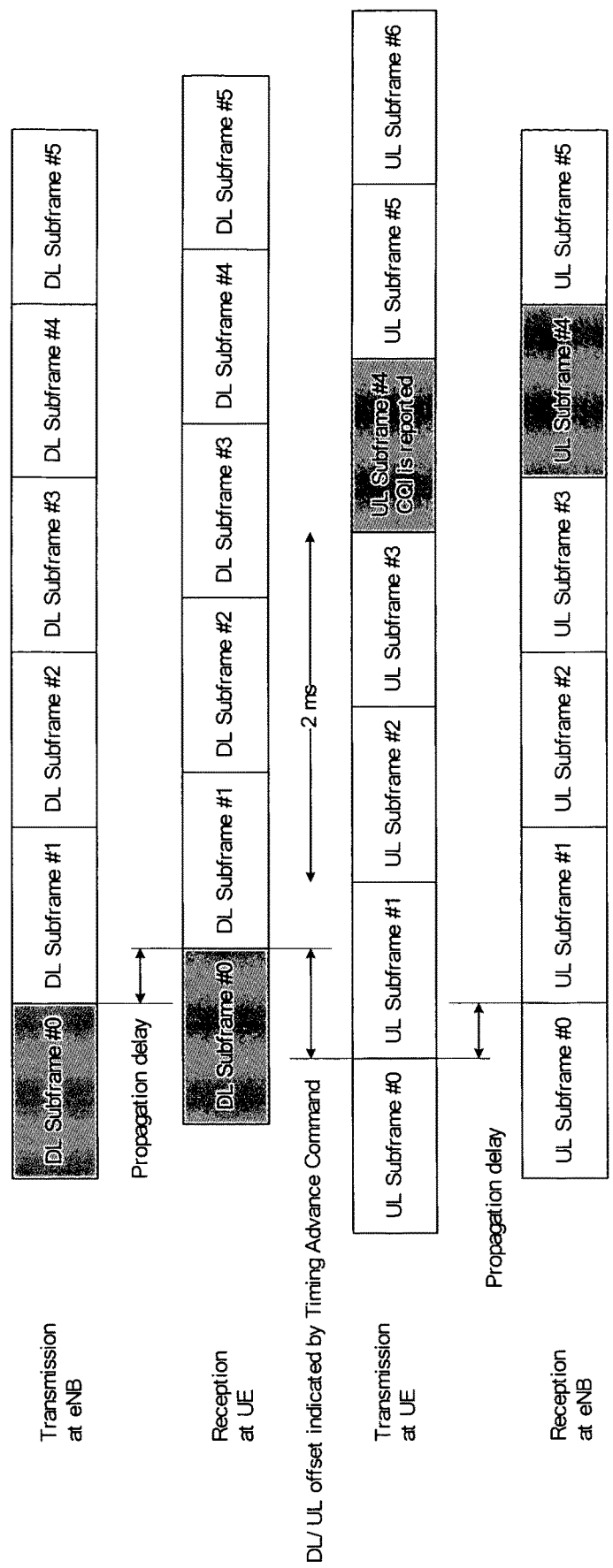
FIG. 5 is a diagram that is useful in understanding the timing of CQI reporting in Rel-8 of LTE.

FIG. 7 is a logic flow diagram that illustrates the operation of a method, and a result of execution of computer program instructions, in accordance with the exemplary embodiments of this invention. In accordance with these exemplary embodiments a method performs, at Block 710, a step of determining whether reporting by at least one user equipment of at least one downlink subframe of a downlink channel is required is preformed. A step of, in response to determining that reporting is not required, sending, to the at least one user equipment, a message configured to cause the at least one user equipment to inhibit reporting measurements of the downlink channel measured during the at least one downlink subframe is preformed at Block 720.

The various blocks shown in FIGS. 4 and 6-7 may be viewed as method steps, and/or as operations that result from operation of computer program code, and/or as a plurality of coupled logic circuit elements constructed to carry out the associated function(s).

An exemplary embodiment in accordance with this invention is a method for control channel signaling. The method includes determining (e.g., by a processor) whether at least one DL subframe is a valid reference resource (e.g., a measurement subframe or CQI reference resource). The method also includes, in response to determining that the at least one DL subframe is not a valid reference resource, inhibiting reporting measurements of a DL channel (e.g., CQI measurements) measured during the at least one DL subframe (e.g., by a processor).

In a further exemplary embodiment of the method above, also including monitoring whether a subframe of the at least one DL subframe includes: a DL assignment and/or an uplink grant.

In another exemplary embodiment of the method above, the method also includes inhibiting performing channel quality measurements of the DL channel during the at least one DL subframe. The method may also include deactivating: a receiver and/or base band circuitry during the at least one DL subframe.

In a further exemplary embodiment of any one of the methods above, the method also includes receiving a message regarding the at least one DL subframe and where determining whether the at least one DL subframe is a valid reference resource is based at least in part on the message. The message may include an indication that the at least one DL subframe is one of: a MBSFN subframe; a blank subframe; and a subframe during a measurement gap.

In another exemplary embodiment of the method above, the message includes an assignment of a CQI reporting mode for at least a duration of the at least one DL subframe. The CQI reporting mode may be an inactive CQI reporting mode. The CQI reporting mode may be: a periodic CQI reporting mode or an aperiodic CQI reporting mode.

In a further exemplary embodiment of any one of the methods above, the measurements are periodic or aperiodic CQI measurements.

In another exemplary embodiment of any one of the methods above, inhibiting reporting measurements is performed at a subframe, N and the at least one DL subframe comprises a subframe N-4.

In a further exemplary embodiment of any one of the methods above, the method is performed by processor executing a computer program tangibly encoded on a computer readable medium.

Another exemplary embodiment in accordance with this invention is an apparatus for control channel signaling. The apparatus includes at least one processor; and at least one memory including computer program code. The at least one memory and the computer program code are configured to, with the at least one processor, cause the apparatus to perform operations. The operations include to determine whether at least one DL subframe is a valid reference resource; and in response to determining that the at least one DL subframe is not a valid reference resource, to inhibit reporting measurements of a DL channel (e.g., CQI measurements) measured during the at least one DL subframe.

In a further exemplary embodiment of the apparatus above, the at least one memory and the computer program code are configured to, with the at least one processor, cause the apparatus to monitor whether a subframe of the at least one DL subframe includes: a DL assignment and/or an uplink grant.

In another exemplary embodiment of the apparatus above, the at least one memory and the computer program code are configured to, with the at least one processor, cause the apparatus to inhibit performing channel quality measurements of the DL channel during the at least one DL subframe. The at least one memory and the computer program code may also be configured to, with the at least one processor, cause the apparatus to deactivate: a receiver and/or base band circuitry during the at least one DL subframe.

In a further exemplary embodiment of any one of the apparatus above, the at least one memory and the computer program code are configured to, with the at least one processor, cause the apparatus to receive a message regarding the at least one DL subframe. Determining whether the at least one DL subframe is a valid reference resource is based at least in part on the message. The message may include an indication that the at least one DL subframe is one of: a MBSFN subframe; a blank subframe; and a subframe during a measurement gap.

In another exemplary embodiment of the apparatus above, the message may include an assignment of a CQI reporting mode for at least a duration of the at least one DL subframe. The CQI reporting mode may be an inactive CQI reporting mode. The CQI reporting mode may be: a periodic CQI reporting mode or an aperiodic CQI reporting mode.

In a further exemplary embodiment of any one of the apparatus above, the measurements are periodic or aperiodic CQI measurements.

In another exemplary embodiment of any one of the apparatus above, inhibiting reporting measurements is performed at a subframe, N and the at least one DL subframe comprises a subframe N-4.

A further exemplary embodiment in accordance with this invention is a computer readable medium for control channel signaling. The computer readable medium is tangibly encoded with a computer program executable by a processor to perform actions. The actions include determining whether at least one DL subframe is a valid reference resource; and in response to determining that the at least one DL subframe is not a valid reference resource, inhibiting reporting measurements of a DL channel (e.g., CQI measurements) measured during the at least one DL subframe.

In another exemplary embodiment of the computer readable medium above, the actions also include monitoring whether a subframe of the at least one DL subframe includes: a DL assignment and/or an uplink grant.

In a further exemplary embodiment of the computer readable medium above, the actions also include inhibiting performing channel quality measurements of the DL channel during the at least one DL subframe. The actions may also include deactivating: a receiver and/or base band circuitry during the at least one DL subframe.

In another exemplary embodiment of any one of the computer readable media above, the actions also include receiving a message regarding the at least one DL subframe and where determining whether the at least one DL subframe is a valid reference resource is based at least in part on the message. The message may include an indication that the at least one DL subframe is one of: a MBSFN subframe; a blank subframe; and a subframe during a measurement gap.

In a further exemplary embodiment of the computer readable medium above, the message includes an assignment of a CQI reporting mode for at least a duration of the at least one DL subframe. The CQI reporting mode may be an inactive CQI reporting mode. The CQI reporting mode may be: a periodic CQI reporting mode or an aperiodic CQI reporting mode.

In another exemplary embodiment of any one of the computer readable media above, the measurements are periodic or aperiodic CQI measurements.

In a further exemplary embodiment of any one of the computer readable media above, inhibiting reporting measurements is performed at a subframe, N and the at least one DL subframe comprises a subframe N-4.

Another exemplary embodiment in accordance with this invention is an apparatus for control channel signaling. The apparatus includes means for determining whether at least one DL subframe is a valid reference resource (e.g., a processor); and means for, in response to determining that the at least one DL subframe is not a valid reference resource, inhibiting reporting measurements of a DL channel (e.g., CQI measurements) measured during the at least one DL subframe (e.g., a processor).

In a further exemplary embodiment of the apparatus above, the apparatus also includes means for monitoring whether a subframe of the at least one DL subframe includes: a DL assignment and/or an uplink grant.

In another exemplary embodiment of the apparatus above, the apparatus also includes means for inhibiting performing channel quality measurements of the DL channel during the at least one DL subframe. The apparatus may also include means for deactivating: a receiver means and/or base band circuitry during the at least one DL subframe.

In a further exemplary embodiment of any one of the apparatus above, the apparatus also includes means for receiving a message regarding the at least one DL subframe and where the determining means determines whether the at least one DL subframe is a valid reference resource based at least in part on the message. The message may include an indication that the at least one DL subframe is: a MBSFN subframe; a blank subframe; and/or a subframe during a measurement gap.

In another exemplary embodiment of the apparatus above, the message includes an assignment of a CQI reporting mode for at least a duration of the at least one DL subframe. The CQI reporting mode may be an inactive CQI reporting mode. The CQI reporting mode may be: a periodic CQI reporting mode; or an aperiodic CQI reporting mode.

In a further exemplary embodiment of any one of the apparatus above, the measurements are periodic or aperiodic CQI measurements.

In another exemplary embodiment of any one of the apparatus above, inhibiting reporting measurements is performed at a subframe, N and the at least one DL subframe comprises a subframe N-4.

A further exemplary embodiment in accordance with this invention is a method for control channel signaling. The method includes determining (e.g., by a processor) whether reporting by at least one UE of at least one DL subframe of a DL channel is required. The method also includes, in response to determining that reporting is not required, sending (e.g., via a transmitter), to the at least one UE, a message configured to cause the at least one UE to inhibit reporting measurements of the DL channel measured during the at least one DL subframe.

In another exemplary embodiment of the method above, determining whether reporting of the at least one DL subframe of the DL channel is required includes determining whether the at least one DL subframe includes: a DL assignment and/or an uplink grant.

In a further exemplary embodiment of any one of the methods above, reporting of the DL channel includes reporting channel quality measurements of the DL channel measured during the at least one DL subframe.

In another exemplary embodiment of any one of the methods above, the message includes an indication that the at least one DL subframe is one of: a MBSFN subframe; a blank subframe; and a subframe during a measurement gap.

In a further exemplary embodiment of any one of the methods above, the message includes an assignment of a CQI reporting mode. The CQI reporting mode may be an inactive CQI reporting mode. The CQI reporting mode may be: a periodic CQI reporting mode or an aperiodic CQI reporting mode.

In another exemplary embodiment of any one of the methods above, the method is performed by processor executing a computer program tangibly encoded on a computer readable medium.

In a further exemplary embodiment of any one of the methods above, the measurements are periodic or aperiodic CQI measurements.

In another exemplary embodiment of any one of the methods above, inhibiting reporting measurements is performed at a subframe, N and the at least one DL subframe comprises a subframe N-4.

A further exemplary embodiment in accordance with this invention is an apparatus for control channel signaling. The apparatus includes at least one processor; and at least one memory including computer program code. The at least one memory and the computer program code are configured to, with the at least one processor, cause the apparatus to perform operations. The operations include to determine whether reporting by at least one UE of at least one DL subframe of a DL channel is required and, in response to determining that reporting is not required, to send, to the at least one UE, a message configured to cause the at least one UE to inhibit reporting measurements of the DL channel measured during the at least one DL subframe.

In another exemplary embodiment of the apparatus above, determining whether reporting of the at least one DL subframe of the DL channel is required includes determining whether the at least one DL subframe includes: a DL assignment and/or an uplink grant.

In a further exemplary embodiment of any one of the apparatus above, reporting of the DL channel includes reporting channel quality measurements of the DL channel measured during the at least one DL subframe.

In another exemplary embodiment of any one of the apparatus above, the message includes an indication that the at least one DL subframe is: a MBSFN subframe; a blank subframe and/or a subframe during a measurement gap.

In a further exemplary embodiment of the apparatus above, the message includes an assignment of a CQI reporting mode. The CQI reporting mode may be an inactive CQI reporting mode. The CQI reporting mode may be: a periodic CQI reporting mode or an aperiodic CQI reporting mode.

In another exemplary embodiment of any one of the apparatus above, the measurements are periodic or aperiodic CQI measurements.

In a further exemplary embodiment of any one of the apparatus above, inhibiting reporting measurements is performed at a subframe, N and the at least one DL subframe comprises a subframe N-4.

Another exemplary embodiment in accordance with this invention is a computer readable medium for control channel signaling. The computer readable medium is tangibly encoded with a computer program executable by a processor to perform actions. The actions include determining whether reporting by at least one UE of at least one DL subframe of a DL channel is required; and, in response to determining that reporting is not required, sending, to the at least one UE, a message configured to cause the at least one UE to inhibit reporting measurements of the DL channel measured during the at least one DL subframe.

In a further exemplary embodiment of the computer readable medium above, determining whether reporting of the at least one DL subframe of the DL channel is required includes determining whether the at least one DL subframe includes: a DL assignment and/or an uplink grant.

In another exemplary embodiment of any one of the computer readable media above, reporting of the DL channel includes reporting channel quality measurements of the DL channel measured during the at least one DL subframe.

In a further exemplary embodiment of any one of the computer readable media above, the message includes an indication that the at least one DL subframe is: a MBSFN subframe; a blank subframe and/or a subframe during a measurement gap.

In another exemplary embodiment of any one of the computer readable media above, the message includes an assignment of a CQI reporting mode. The CQI reporting mode may be an inactive CQI reporting mode. The CQI reporting mode may be: a periodic CQI reporting mode or an aperiodic CQI reporting mode.

In a further exemplary embodiment of any one of the computer readable media above, the measurements are periodic or aperiodic CQI measurements.

In another exemplary embodiment of any one of the computer readable media above, inhibiting reporting measurements is performed at a subframe, N and the at least one DL subframe comprises a subframe N-4.

A further exemplary embodiment in accordance with this invention is an apparatus for control channel signaling. The apparatus includes means for determining whether reporting by at least one UE of at least one DL subframe of a DL channel is required (e.g., a processor); and means for, in response to determining that reporting is not required, sending, to the at least one UE, a message configured to cause the at least one UE to inhibit reporting measurements of the DL channel measured during the at least one DL subframe (e.g., a processor).

In another exemplary embodiment of the apparatus above, the determining means includes means for determining whether the at least one DL subframe includes: a DL assignment and/or an uplink grant.

In a further exemplary embodiment of any one of the apparatus above, the reporting means includes means for reporting channel quality measurements of the DL channel measured during the at least one DL subframe.

In another exemplary embodiment of any one of the apparatus above, the message includes an indication that the at least one DL subframe is: a MBSFN subframe; a blank subframe and/or a subframe during a measurement gap.

In a further exemplary embodiment any one of the apparatus above, the message includes an assignment of a CQI reporting mode. The CQI reporting mode may be an inactive CQI reporting mode. The CQI reporting mode may be: a periodic CQI reporting mode or an aperiodic CQI reporting mode.

In another exemplary embodiment of any one of the apparatus above, the measurements are periodic or aperiodic CQI measurements.

In a further exemplary embodiment of any one of the apparatus above, inhibiting reporting measurements is performed at a subframe, N and the at least one DL subframe comprises a subframe N-4.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of exemplary embodiments in accordance with this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of exemplary embodiments of the inventions may be practiced in various components such as integrated circuit chips and modules, and that various exemplary embodiments in accordance with this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with various exemplary embodiments in accordance with this invention.

Various modifications and adaptations to the foregoing exemplary embodiments in accordance with this invention may become apparent to those skilled in the relevant arts in view of the foregoing description, when read in conjunction with the accompanying drawings. However, any and all modifications will still fall within the scope of the non limiting and exemplary embodiments in accordance with this invention.

For example, while the exemplary embodiments have been described above in the context of the E-UTRAN (UTRAN LTE) system, it should be appreciated that exemplary embodiments in accordance with this invention are not limited for use with only this one particular type of wireless communication system, and that they may be used to advantage in other wireless communication systems such as, for example, further revisions of the UTRAN-LTE system, including LTE-A.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non limiting and non exhaustive examples.

Further, the various names used for the described parameters and modes of operation (e.g., cqi-ReportingModeAperiodic, MBFSN, etc.) are not intended to be limiting in any respect, as these parameters and modes may be identified by any suitable names. Further, the various names assigned to different channels (e.g., PDCCH, PDSCH, etc.) are not intended to be limiting in any respect, as these various channels may be identified by any suitable names.

Furthermore, some of the features of the various non limiting and exemplary embodiments in accordance with this invention may be used to advantage without the corresponding use of other features. As such, the foregoing description should be considered as merely illustrative of the principles, teachings and exemplary embodiments in accordance with this invention, and not in limitation thereof.

The invention claimed is:

1. A method comprising:
receiving a message regarding at least one downlink subframe;
determining, based at least in part on the received message, whether the at least one downlink subframe is a valid channel quality indicator reference resource; and
in response to determining that the at least one downlink subframe is not a valid channel quality indicator reference resource, inhibiting reporting measurements of a downlink channel measured during the at least one downlink subframe,
wherein the message comprises SystemInformationBlockType2.

2. The method of claim 1, further comprising monitoring whether a subframe of the at least one downlink subframe comprises at least one of: a downlink assignment, or an uplink grant.

3. The method of claim 1, further comprising inhibiting performing channel quality measurements of the downlink channel during the at least one downlink subframe.

4. The method of claim 1, further comprising deactivating at least one of: a receiver, or base band circuitry during the at least one downlink subframe.

5. The method of claim 1, where the message comprises an indication that the at least one downlink subframe is at least one of: a multicast/broadcast single frequency network subframe; a blank subframe; or a subframe during a measurement gap.

6. The method of claim 1, where the message comprises an assignment of a channel quality indicator reporting mode for at least a duration of the at least one downlink subframe.

7. The method of claim 6, where the channel quality indicator reporting mode is an inactive channel quality indicator reporting mode.

8. The method of claim 6, where the channel quality indicator reporting mode is one of: a periodic channel quality indicator reporting mode; and an aperiodic channel quality indicator reporting mode.

9. An apparatus comprising:
at least one processor; and
at least one memory including computer program code, the at least one memory and the computer program code configured, with the at least one processor, to cause the apparatus at least to:
receive a message regarding at least one downlink subframe;
determine, based at least in part on the received message, whether the at least one downlink subframe is a valid channel quality indicator reference resource; and
in response to determining that the at least one downlink subframe is not a valid channel quality indicator reference resource, inhibit reporting measurements of a downlink channel measured during the at least one downlink subframe,
wherein the message comprises SystemInformationBlockType2.

10. The apparatus of claim 9, where the at least one memory and the computer program code are configured to, with the at least one processor, cause the apparatus to monitor whether a subframe of the at least one downlink subframe comprises at least one of: a downlink assignment, or an uplink grant.

11. The apparatus of claim 9, where the at least one memory and the computer program code are configured to, with the at least one processor, cause the apparatus to inhibit performing channel quality measurements of the downlink channel during the at least one downlink subframe.

12. The apparatus of claim 9, where the at least one memory and the computer program code are configured to, with the at least one processor, cause the apparatus to deactivate at least one of: a receiver, or base band circuitry during the at least one downlink subframe.

13. The apparatus of claim 9, where the message comprises an indication that the at least one downlink subframe is at least one of: a multicast/broadcast single frequency network subframe; a blank subframe; or a subframe during a measurement gap.

14. The apparatus of claim 9, where the message comprises an assignment of a channel quality indicator reporting mode for at least a duration of the at least one downlink subframe.

15. The apparatus of claim 14, where the channel quality indicator reporting mode is an inactive channel quality indicator reporting mode.

16. The apparatus of claim 14, where the channel quality indicator reporting mode is one of:
 a periodic channel quality indicator reporting mode; and
 an aperiodic channel quality indicator reporting mode.

17. A non-transitory computer readable medium tangibly encoded with a computer program executable by a processor to perform actions comprising:
 receiving a message regarding at least one downlink subframe;
 determining, based at least in part on the received message, whether the at least one downlink subframe is a valid channel quality indicator reference resource; and
 in response to determining that the at least one downlink subframe is not a valid channel quality indicator reference resource, inhibiting reporting measurements of a downlink channel measured during the at least one downlink subframe,
 wherein the message comprises SystemInformationBlockType2.

* * * * *